Sept. 2, 1969 L. W. JOHNSON ET AL 3,464,376
PLANTER
Filed May 3, 1966 3 Sheets-Sheet 1
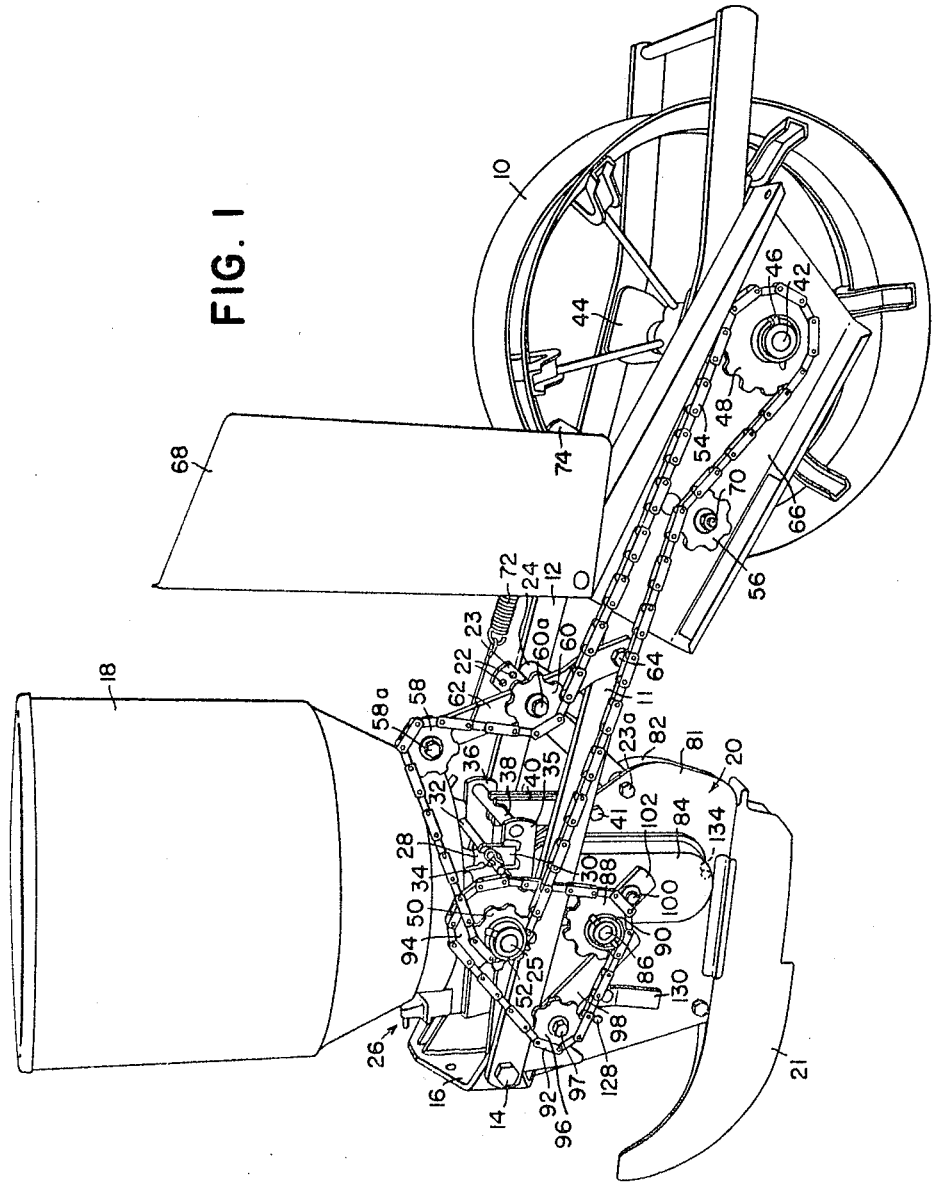
FIG. I
INVENTORS.
LESLIE W. JOHNSON
EDWIN W. REEDER
BY
John C. Thompson
ATTORNEY

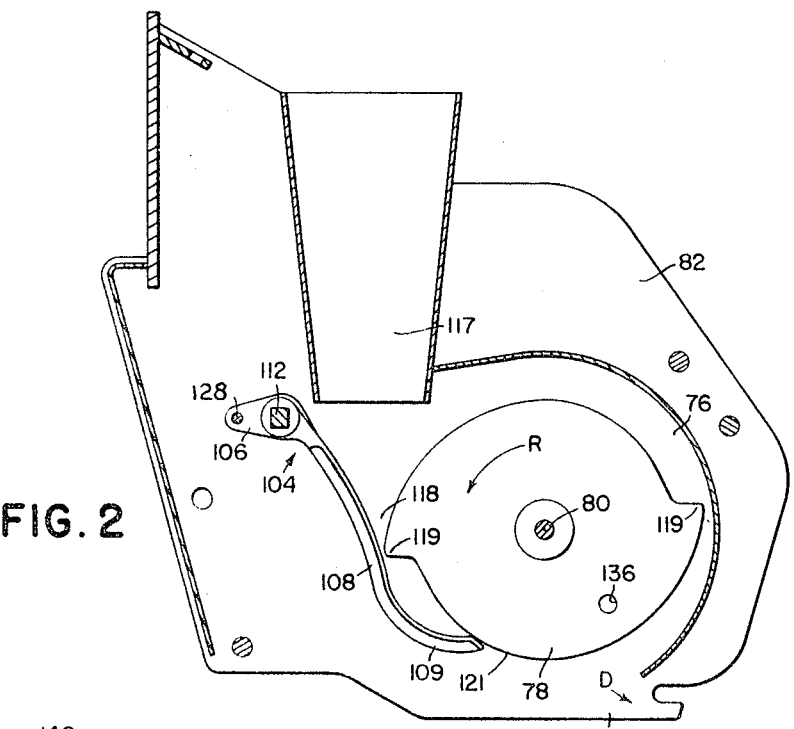
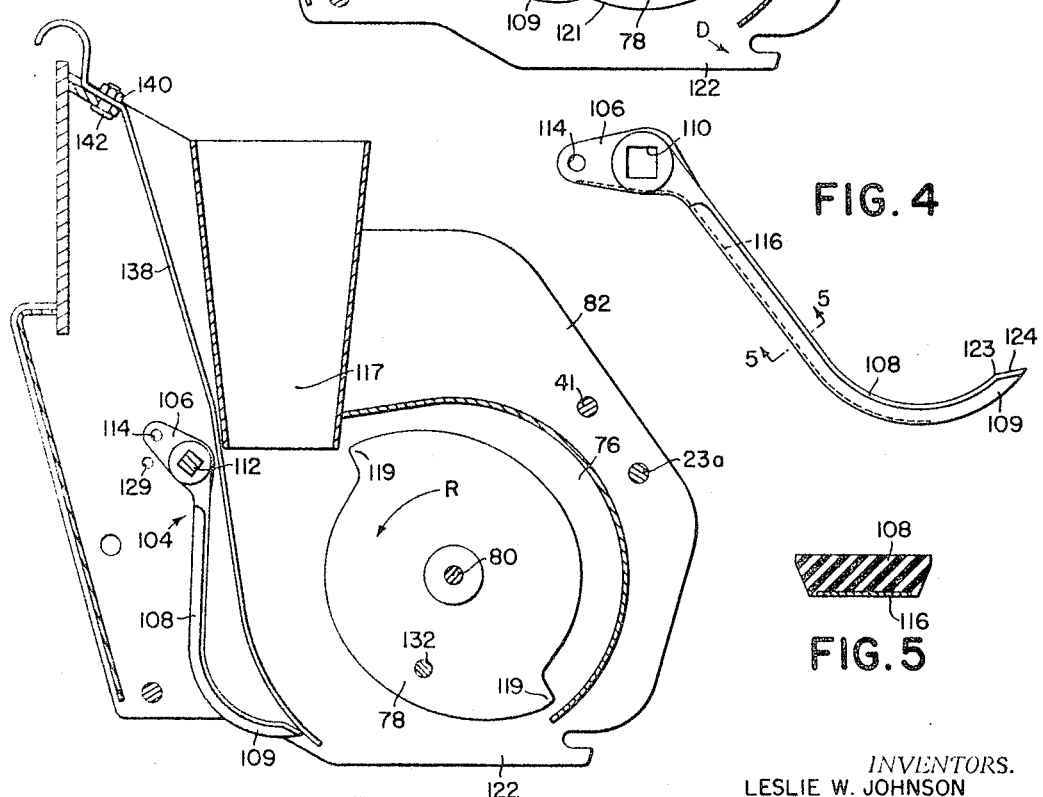

INVENTORS.
LESLIE W. JOHNSON
EDWIN W. REEDER

United States Patent Office 3,464,376
Patented Sept. 2, 1969

3,464,376
PLANTER
Leslie William Johnson, Moline, and Edwin William
Reeder, Rock Island, Ill., assignors to Deere &
Company, Moline, Ill., a corporation of Delaware
Filed May 3, 1966, Ser. No. 547,329
Int. Cl. A01c 7/18; G01f 11/24
U.S. Cl. 111—51      1 Claim

ABSTRACT OF THE DISCLOSURE

A seed boot for a planter which selects individual seeds. The boot is provided with a rotary valve which cooperates with a rubber and spring steel cutoff valve to group the individual seeds into hills. Structure is provided to hold the rotary valve and the cutoff valve in inoperative positions to permit drilling of the seed.

---

The present invention relates generally to agricultural implements and more particularly to planters and the like in which seeds may be deposited either individually (called drilling) or in a plurality of spaced apart groups (called hill dropping).

The object and general nature of this invention is the provision in a planter of a hill drop mechanism especially constructed and arranged to hill drop seeds without cracking of the seeds. More particularly it is an object of the present invention to provide in a planter, having a rotatable hill drop wheel in the seed boot which rotates in such a manner that its rearward peripheral speed is equal to the forward speed of the planter, a cutoff valve having a free lower end made of elastomeric material.

A further object of this invention is to provide for a seed boot having a rotary hill drop wheel an elongated resilient cutoff valve secured only at its upper end, the valve being formed essentially of elastomeric material and all but the last 1¾" being backed by a steel spring.

A further object of this invention is to provide a rotary hill drop wheel and an elongated resilient cutoff valve normally for a planter seed boot, the parts normally being adapted to cooperate with each other for hilling, and of further means for holding the cutoff valve from engagement with the hill drop wheel whereby seed may be drilled from said seed boot.

A still further object of this invention is to provide a seed boot construction for a planter in which seeds may be either drilled or hill dropped, the construction being reliable in operation, substantially maintenance free, and of relatively low cost.

These and other objects and advantages of this invention will be apparent to those skilled in the art after a consideration of the following detailed description, taken in conjunction with the accompanying drawings in which the preferred form of this invention is illustrated.

FIG. 1 is a perspective view of a unit planter in which the principles of the present invention have been incorporated.

FIG. 2 is a sectional view through the seed boot of the planter shown in FIG. 1 showing the cutoff valve and rotary hill drop wheel in their hill drop position.

FIG. 3 is a sectional view similar to FIG. 2 in which the cutoff valve and hill drop wheel are shown in the positions that they occupy when drilling.

FIG. 4 is an enlarged view of the cutoff valve shown in FIGS. 2 and 3.

FIG. 5 is a sectional view of the cutoff valve taken along lines 5—5 in FIG. 4.

Figure 6:
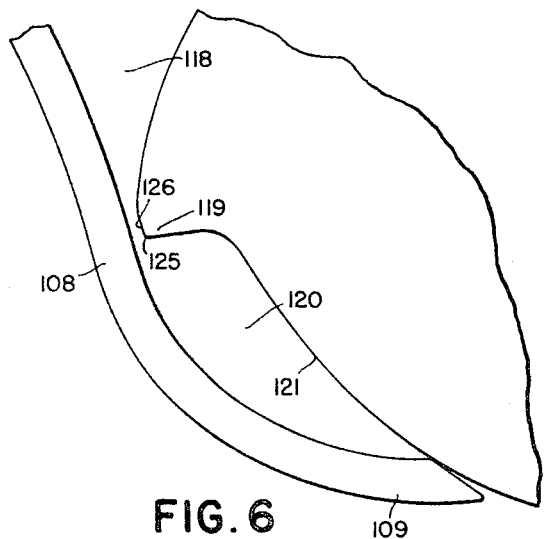
FIGS. 6–10 are detail views of the hill drop wheel and cutoff valve in various positions of rotation of the hill drop wheel.

In the following description right-hand and left-hand reference is determined by standing to the rear of the planter and facing the direction of travel.

Referring first to FIG. 1, the planter in which the principles of the present invention have been incorporated includes a press wheel 10 which is rotatably carried on left and right press wheel arms 11, 12, the forward ends of which are pivotally secured by means of bolts 14 to the mounting structure 16 of a planter. The planter also includes a seed hopper 18 which is removably secured to a seed boot 20 which carries on its lower end a furrow opener 21. The mounting structure 16 can be secured to the toolbar carried by a tractor in any conventional manner, the manner of securement not being material to the present invention. The planting depth of the planting unit is gauged by the planter press wheel 10, the depth being determined by the setting of a spring locking pin (not shown) which passes through one of the apertures 22 in the depth adjusting strap 23, the pin bearing against a forwardly extending bracket (not shown) which is welded to the cross shaft 24 which extends between the arms 11, 12. The depth adjusting strap 23 is pivotally secured to the seed boot by means of fastener 23a.

The seed hopper 18 carries conventional seed selecting means such as seed plates which are driven through a drive shaft 25, and the hopper is removably secured to the seed boot by a forward fastening device, indicated generally at 26, and at its rear end by downwardly depending apertured lugs 28 which are secured to upwardly extending ears 30 on the hopper mounting frame by means of a transversely extending rod 32 which is secured in place by means of a spring locking pin 34. The hopper mounting structure also includes left- and right-hand longitudinally extending frame bars 35, 36 which are interconnected at their rear ends by a transversely extending rod 38 which is welded to upstanding brackets 40 secured to the seed boot at 41. The ears 30 are welded to the rear end of the bars 35, 36. The forward ends of the bars 35, 36 are secured to the planter mounting structure by means of the bolt 14.

The press wheel 10 is fixed to an axle 42 which is journaled for rotation within bearings carried by supports 44, one end of the axle 42 projecting outwardly beyond the left-hand bearing support (not shown) and being apertured to receive a quick attaching pin 46 which holds a sprocket 48 on the axle 42 for rotation therewith. A sprocket 50 is mounted on the drive shaft 25 and is secured thereto by a quick attaching pin 52. A drive chain 54 drivingly interconnects the sprockets 50 and 48 and is also trained over an idler sprocket 56 and tensioning sprockets 58 and 60. The tensioning sprockets 58 and 60 are carried on stub axles 58a, 60a which project outwardly from a pivoted link 62, the lower end of the link 62 being secured to the arm 11 by means of a pivot bolt 64. A drive shield 66 having a pivoted cover 68 is normally disposed over the rearward end of the drive chain 54 and sprockets 48 and 56, the sprocket 56 being secured to the drive shield 66 also by means of a stub axle 70. A spring 72 interconnects the pivoted link 62 with the upper end of a bracket 74 which also serves to interconnect the forward end of the drive shield 66 with the arm 11, the spring biasing the link 62 rearwardly, thereby placing the chain 54 under tension.

As can be seen from FIGS. 2 and 3, the seed boot is provided with a wheel chamber 76 which receives a generally vertical rotary hill drop wheel 78. The hill drop wheel 78 is rigidly secured to an axle 80 which projects outwardly of the left-hand side plate 81 of the seed boot, the right-hand side plate 82 carrying means in which the right-hand end of the axle 80 is journaled. The left-hand end projects into the hill drop drive mechanism housing 84, the left-hand end of the axle 80 carrying a sprocket which engages a chain which in turn carries another sprocket (the sprockets and chain within the housing not being shown) the last-mentioned sprocket being secured to an axle 86 which projects outwardly of the housing and carries on its left-hand end a sprocket 88 which is secured thereto by means of a quick attach pin 90. The sprocket 88 is driven by a second drive chain 92, one end of which is disposed over drive sprocket 94 secured to the drive shaft 24, a portion of the chain 92 being disposed over tensioning sprocket 96. The tensioning sprocket 96 is carried on a stub axle 97 which projects outwardly from a pivoted spring biased arm 98. The housing 84 is secured to the side plate 81 by means of an outwardly extending fastener 100 which carries a clamping plate 102, one end of the fastener being received in the side plate 81 and forcing the clamp plate 102 into holding engagement with the outer surface of the housing 84.

Mounted within the seed boot housing in addition to the hill drop wheel 78 is a cutoff valve, indicated generally at 104. As can best be seen in FIG. 4 the cutoff valve is provided with an enlarged upper end 106, a downwardly extending relatively elongated curved intermediate portion 108, and a terminal end portion 109. The upper end 106 is provided with a square aperture 110 which receives a square pin 112. The upper end 106 is also provided with a second aperture 114. The cutoff valve 104 is formed entirely of rubber with the exception of a spring steel backing strip 116 (FIG. 5) which extends from the upper end 106 down along the downwardly depending curved portion 108 until 1¾" from the terminal end. By employing the spring steel backing strip 116 it is possible to make the depending intermediate portion 108 and terminal end portion 109 of differing resilient qualities, thus the terminal end portion 109 having more resilient flex than the intermediate portion 108.

In operation when hill dropping, as the planter is propelled forwardly over the ground the press wheel 10 will cause the rotor 78 to rotate in the direction indicated by the arrow R through chains 54 and 92 and the interconnecting sprockets. The seed selecting mechanism within the hopper 18 will also be caused to operate by the rotation of the press wheel 10 and the seeds will be dropped from the hopper into the seed receiving chamber 117 of the boot and then to the open pocket 118 defined by the valve 104 and the rotor 78. The seeds will drop at a predetermined rate, as for example, six seeds for each revolution of the rotor 78. As the rotor continues to rotate one of the hill drop cell forming lobes 119 will come into contact with the intermediate portion 108 and will cause an enclosed pocket 120 to be formed below the open pocket 118 and between the end 109 and the point where the lobe 119 contacts the elongated portion 108 as best shown in FIG. 6. Continued rotation of the rotor 78 will cause the seed to be confined within a gradually diminishing pocket (FIG. 7) until finally the lobe 119 forces the end 109 away from the peripheral surface 121 permitting the seeds to be ejected rearwardly through the bottom opening 122 of the furrow opener 22. After the pocket 120 has been enclosed by the lobe 119 contacting the portion 108 as further seeds are dropped they are caught in the newly formed open pocket 118 above the contacting portions.

Figure 7:
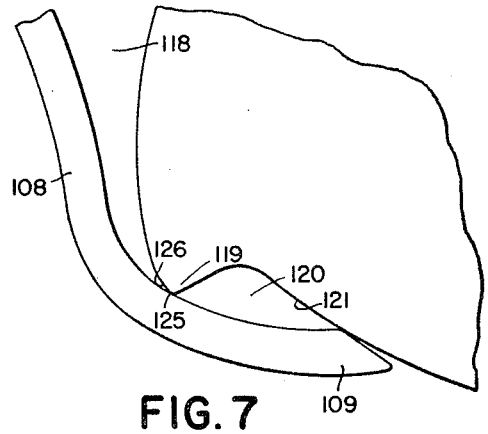
Figure 8:
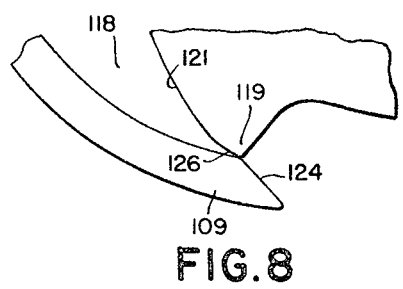
Figure 9:
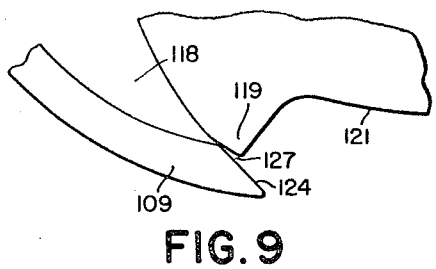
Figure 10:
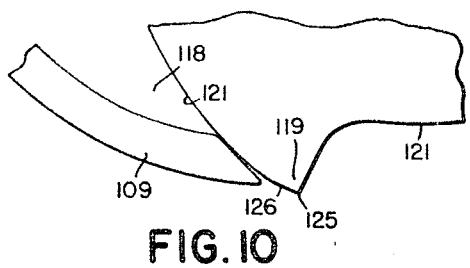

As the rotor continues to rotate in the direction R from the position shown in FIG. 7, the terminal end 109 of the cutoff valve will move away from the surface 121 until the leading edge 123 of the bevel 124 on the end 109 comes into contact with the leading edge 125 of the flat 126 formed on the lobe 119 (FIG. 8). At this point the seeds are free to be discharged in the direction indicated by the arrow D. As the rotor 78 advances from the position shown in FIG. 8 to the position shown in FIG. 9, a gap 127 opens between the flat 126 on the rotor and the bevel 124 on the cutoff valve. This gap aids in the ejection of lint covered cotton seed without having the lint on the seed becoming caught between the rotor 78 and valve 104 which would cause the seed to dribble out.

The sprockets and other drive parts are preferably so sized that the rearward circumferential speed of the rotor 78 will be equal to the forward speed of the planter. Thus if it is desired to change the spacing of the hills another rotor could be substituted having a different number of lobes, such as for example three.

If one desires to drill with the planting mechanism of this invention it is a relatively simple matter to convert from a hill drop mechanism to a drilling mechanism. To this end it is only necessary to remove the hopper mechanism 18 from the hopper mounting structure, to remove the pin 128 from the aperture 114 and the corresponding apertures 129 in the boot side plates 81, 82, this pin normally holding the upper portion in the position shown in FIG. 2, to rotate the cutoff valve 104 to the position shown in FIG. 3 by swinging the handle 130 clockwise, and to rotate the hill drop wheel 78 to the position also shown in FIG. 3 whereby it can be locked in that position by inserting pin 132 through the apertures 134 in the side plates 81, 82 and through the corresponding hole 136 in the wheel 78. The drive chain 92 is also disconnected so that rotation of the sprocket 94 will not cause corresponding rotation of the sprocket 88. The drill plate 138 is then inserted in the manner shown in FIG. 3, the upper end being secured by nut and cap screw 140, 142. Finally the hopper is reassembled onto the hopper mounting frame and the parts are ready for drilling.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

What is claimed is:

1. A planter construction including a seed boot having an upper seed chamber and a wheel chamber disposed generally below said seed chamber and open at its lower end to provide for discharge of seed therethrough, a generally vertical rotary hill drop wheel having hill drop cell forming portions on its periphery, said hill drop wheel being mounted for rotation in said wheel chamber, an elongated resilient cutoff valve secured only at its upper end to said seed boot, the lower end portion of said valve being adapted to contact said hill drop wheel and formed of elastomeric material whereby cracking of seeds is minimized, means provided for the reception of drill plate means between said hill drop wheel and said cutoff valve, and means provided to hold said hill drop wheel from rotation.

References Cited

UNITED STATES PATENTS

| 737,857 | 9/1903 | McDaniel | 111—36 |
| 3,142,275 | 7/1964 | Buhr | 111—51 |
| 3,240,174 | 3/1966 | Jones | 111—77 X |
| 3,276,404 | 10/1966 | Cagle | 111—51 |
| 3,335,680 | 8/1967 | Bauman et al. | 111—51 |

FOREIGN PATENTS

| 42,934 | 7/1910 | Austria. |
| 828,034 | 2/1960 | Great Britain. |

ROBERT E. BAGWILL, Primary Examiner

ALAN E. KOPECKI, Assistant Examiner

U.S. Cl. X.R.

222—313